(12) United States Patent
Nakajima et al.

(10) Patent No.: US 7,592,799 B2
(45) Date of Patent: Sep. 22, 2009

(54) MAGNETIC ENCODER AND WHEEL SUPPORT BEARING ASSEMBLY USING THE SAME

(75) Inventors: Tatsuo Nakajima, Iwata (JP); Kouya Oohira, Iwata (JP); Arito Matsui, Iwata (JP); Kazutoyo Murakami, Iwata (JP)

(73) Assignee: NTN Corporation, Osaka (JP)

( * ) Notice: Subject to any disclaimer, the term of this patent is extended or adjusted under 35 U.S.C. 154(b) by 116 days.

(21) Appl. No.: 11/662,282

(22) PCT Filed: Sep. 10, 2004

(86) PCT No.: PCT/JP2004/013210

§ 371 (c)(1),
(2), (4) Date: Mar. 9, 2007

(87) PCT Pub. No.: WO2006/027845

PCT Pub. Date: Mar. 16, 2006

(65) Prior Publication Data

US 2007/0273362 A1    Nov. 29, 2007

(51) Int. Cl.
*G01B 7/30* (2006.01)
*G01P 3/487* (2006.01)
*F16C 33/04* (2006.01)

(52) U.S. Cl. ............... 324/174; 324/207.25; 384/448

(58) Field of Classification Search ........... 324/160, 324/166, 173, 174, 178, 179, 207.22, 207.25; 384/448; 29/607, 608, 609
See application file for complete search history.

(56) References Cited

U.S. PATENT DOCUMENTS

| | | | |
|---|---|---|---|
| 5,427,675 A | 6/1995 | Toyama et al. | |
| 5,431,413 A | 7/1995 | Hajzler | |
| 5,522,268 A | 6/1996 | Wenzel | |
| 5,575,568 A | 11/1996 | Rigaux et al. | |
| 5,969,518 A | 10/1999 | Merklein et al. | |
| 6,045,267 A | 4/2000 | Merklein et al. | |
| 6,186,667 B1 | 2/2001 | Nakamura et al. | |
| 6,211,584 B1 * | 4/2001 | Kurosawa et al. | 310/45 |

(Continued)

FOREIGN PATENT DOCUMENTS

EP    0 249 973    12/1987

(Continued)

OTHER PUBLICATIONS

Supplementary European Search Report issued in corresponding European Patent Application No. 04787850.9; mailed on Apr. 23, 2008.

(Continued)

*Primary Examiner*—Kenneth J Whittington
(74) *Attorney, Agent, or Firm*—Staas & Halsey LLP

(57) ABSTRACT

A magnetic encoder includes a multipolar magnet, having magnetic poles formed therein so as to alternate with each other in a direction circumferentially thereof, and a core metal supporting the multipolar magnet. The multipolar magnet is prepared from a sintered element formed by sintering a powdery mixture of a magnetic powder and a non-magnetic metallic powder. This multipolar magnet is fixed to the core metal to form a unitary component made up of the sintered element and the core metal. The unitary component is subjected to a surface treatment for anticorrosion.

15 Claims, 8 Drawing Sheets

U.S. PATENT DOCUMENTS

| | | |
|---|---|---|
| 6,573,705 B1 | 6/2003 | Tajima et al. |
| 6,692,153 B2 | 2/2004 | Ohtsuki et al. |
| 6,692,582 B1 | 2/2004 | Kojima et al. |
| 6,789,948 B2 | 9/2004 | Nakajima |
| 7,237,960 B2 * | 7/2007 | Oohira et al. ............... 384/448 |
| 2001/0000713 A1 | 5/2001 | Nakamura et al. |
| 2002/0126926 A1 | 9/2002 | Ohtsuki et al. |
| 2002/0140418 A1 | 10/2002 | Ichiman |
| 2003/0059139 A1 | 3/2003 | Nakajima |

FOREIGN PATENT DOCUMENTS

| | | |
|---|---|---|
| EP | 0 481 224 | 4/1992 |
| EP | 0 785 369 | 7/1997 |
| EP | 0 992 797 | 4/2000 |
| EP | 0 995 538 | 4/2000 |
| EP | 1 296 144 | 3/2003 |
| JP | 63-115008 | 5/1988 |
| JP | 63-300910 | 12/1988 |
| JP | 2-122356 | 10/1990 |
| JP | 4-73907 | 3/1992 |
| JP | 4-172220 | 6/1992 |
| JP | 4-354104 | 12/1992 |
| JP | 5-14829 | 2/1993 |
| JP | 5-47528 | 2/1993 |
| JP | 06-281018 | 10/1994 |
| JP | 6-281018 | 10/1994 |
| JP | 6-340902 | 12/1994 |
| JP | 7-212997 | 8/1995 |
| JP | 8-75500 | 3/1996 |
| JP | 9-33551 | 2/1997 |
| JP | 9-133698 | 5/1997 |
| JP | 9-329611 | 12/1997 |
| JP | 63-115008 | 5/1998 |
| JP | 10-160744 | 6/1998 |
| JP | 2816783 | 8/1998 |
| JP | 10-0233310 A * | 9/1998 |
| JP | 11-257998 | 9/1999 |
| JP | 11-303879 | 11/1999 |
| JP | 2000-221202 | 8/2000 |
| JP | 2000-221204 | 8/2000 |
| JP | 2000-249138 | 9/2000 |
| JP | 2001-272250 | 10/2001 |
| JP | 2002-333033 | 11/2002 |
| JP | 2003-35565 | 2/2003 |
| JP | 2003-57070 | 2/2003 |
| JP | 2004-037441 | 2/2004 |
| JP | 2004-084925 | 3/2004 |
| JP | 2004-085534 | 3/2004 |
| JP | 2004-85534 | 3/2004 |
| JP | 2005-43294 | 2/2005 |

OTHER PUBLICATIONS

Office Action mailed on Sep. 30, 2008 and issued in corresponding Japanese Patent Application No. 2003-279563.

* cited by examiner

MAGNETIC ENCODER AND WHEEL SUPPORT BEARING ASSEMBLY USING THE SAME

BACKGROUND OF THE INVENTION

1. Field of the Invention

The present invention generally relates to a magnetic encoder for use in, for example, a rotation detecting device incorporated in a bearing which undergoes relative rotation and also relates to a wheel support bearing assembly using such magnetic encoder. More particularly, the present invention relates to the magnetic encoder, which forms a part of a bearing seal disposed in a rotation detecting device in, for example, an automobile anti-skid brake system for detecting the respective numbers of revolutions of front and rear vehicle wheels.

2. Description of the Prior Art

Hitherto, the rotation detecting device for the prevention of skidding of an automotive vehicle has largely employed the following structure. Specifically, the rotation detecting device generally includes a serrated rotor and a detecting sensor, which are arranged spaced by a sealing device sealing a bearing, forming one independent rotation detecting device. In this conventional rotation detecting device, the serrated rotor mounted on a rotary shaft is detected by a rotation detecting sensor fitted to a knuckle, and the bearing used in association therewith is protected by a sealing device, provided independently on a side portion thereof, from water and/or foreign matters.

As another example, the Japanese Patent No. 2816783, first published Sep. 17, 1993, under the JP Laid-open Patent Publication No. 05-238369, discloses a bearing seal incorporating a rotation detecting device for the detection of the rotational speed of the vehicle wheel, which seal is designed to minimize the space for installation of the rotation detecting device and to drastically increase the detecting performance. In this bearing seal, an elastic member mixed with a magnetic metallic powder is bonded by vulcanization in a circumferential shape to a slinger along a peripheral surface of the slinger and is magnetized to have alternating magnetic poles deployed in a direction circumferentially of the slinger.

Also, the JP Laid-open Patent Publication No. 6-281018, Oct. 7, 1994, discloses a built-in coder sealing structure designed to minimize the axial dimension of the sealing structure on one hand and, on the other hand, to improve the sealability between rotatable and stationary members to thereby facilitate the mounting of the sealing structure. This built-in coder sealing structure includes a sealing member for sealing between the rotatable and stationary members while a rotary disc is mounted on the rotatable member and a coder having a plurality of magnetic poles is fitted to the rotary disc. The coder is made of an elastomer added with magnetic particles and has one side face held substantially in flush with the stationary member.

The coder made of a plastic material (plastomer) containing a powdery magnetic material or magnetic particles may be molded by, for example, the injection molding or compression molding to the shape of a product with the use of a mold assembly having a mold cavity complemental in shape to the shape of the product, that is, molded precisely to have a shape which is a replica of the molding cavity, or form a sheet by means of an extrusion molding technique using a T-shaped die or by means of a sheet molding technique such as a calendar molding and a blanking technique, which coder is subsequently fixedly bonded to a metallic substrate with the use of a bonding agent. Also, in such case, the coder may be made in such a manner that while the metallic substrate is placed inside the mold cavity such as experienced with the insert molding, a molten resin is subsequently poured into the molding cavity to carry out the molding and the bonding simultaneously.

However, any of the magnetic encoders discussed above contains the magnetic powder in the multipolar magnet and, on the other hand, since in the case where the magnetic encoder is used in an automobile bearing or the like, the magnetic encoder is placed in a severe environment exposed to muddy salt water on the road surface, rusting occurs during the use thereof for a long period of time. In particular, where the amount of the magnetic powder is increased so that the magnetic encoder can be manufactured compact in size, rusting tends to occur easily. In view of this, an attempt has been made to treat the multipolar magnet of the magnetic encoder to have a resistance to rusting, selection of a proper anti-rusting material is difficult to achieve.

Also, since the multipolar magnet prepared from the plastomer or the elastomer containing the magnetic powder as described above have the following problems as will be discussed subsequently, the Applicant of the instant application has suggested in the JP Laid-open Patent Publication No. 2004-037441, published Feb. 5, 2004, the multipolar magnet in the form of a sintered element formed by sintering a powdery mixture of magnetic metallic powder and non-magnetic metallic powder. In the case of the multipolar magnet so manufactured, an anti-rusting treatment appropriate to the characteristic of the sintered magnet is required.

In addition, the Applicant of the instant application has suggested, in the JP Laid-open Patent Publication No. 2004-085534, published Mar. 18, 2004, the multipolar magnet having its surfaces formed with an anti-rusting film of a high corrosion-preventive clear paint. However, painting of the multipolar magnet with the clear paint of modified epoxy system by means of a dip method or a spray method requires the resultant film to have a substantial film thickness particularly where the multipolar magnet must satisfy the corrosion proofing performance as required in underbody component parts of the automotive vehicles, resulting in increase of the cost. Also, masking is often required, resulting in complication of the process. Yet, in order to secure the uniformity of the film thickness and the flatness on a film forming surface, the margin of control of painting and baking during the film forming is so narrow that the yield may tends to be low. In addition, in order to increase the corrosion proofing performance between a core metal and a sintered element while the multipolar magnet, which is the sintered element, is staked to the core metal, an impregnating treatment of the clear paint of the modified epoxy system, a pore sealing treatment and/or a separate painting of the sintered element are often performed, but this is not economical since the cost increases.

SUMMARY OF THE INVENTION

In view of the foregoing, an object of the present invention is to provide a magnetic encoder of a kind which is excellent in corrosion proofing, useable for a long period of time, free from a problem associated with rusting even though used under a severe environment, and excellent in productivity and which can therefore reduce the cost.

Another object of the present invention is to provide a wheel support bearing assembly, which can be manufactured with no increase in number of component parts used, capable of accomplishing the detection of rotation with a compact structure and makes use of the magnetic encoder for the detection of the rotation that is excellent in corrosion proofing and productivity and with which the cost can be reduced.

A magnetic encoder of the present invention includes a multipolar magnet, having magnetic poles formed therein so as to alternate with each other in a direction circumferentially thereof, and a core metal supporting the multipolar magnet. The multipolar magnet is prepared from a sintered element formed by sintering a powdery mixture of a magnetic powder and a non-magnetic metallic powder and is fixed to the core metal to form a unitary component made up of the sintered element and the core metal. The unitary component is subjected to a surface treatment for anticorrosion.

It is to be noted that in the specification, the term "staking" means a process in general used to fixing and fastening by plastic deformation with a pressure applied and is intended to encompass fixing and fastening by, for example, bending or crimping.

According to this construction, since the unitary component of the sintered element and the core metal, in which the multipolar magnet, which is a sintered element, is fixed to the core metal by staking, is subjected to a surface treatment for anticorrosion purpose, it can have an excellent anticorrosion property and will become free from problems associated with the occurrence of rusting during the use thereof for a long period of time under the severe environment. Since the surface treatment is applied to the unitary component of the sintered element and the core metal, as compared with the surface treatment applied separately to the individual component parts, the number of process steps can be minimized, an excellent productivity can be obtained and the cost can be lowered.

In the magnetic encoder of the present invention, the surface treatment may be an electrodeposition. Considering that the electrodeposition process gives rise to a better adhesion of the coating material than the coating process the entire surface of the unitary component can be coated and, therefore, the anticorrosion property of the multipolar magnet in its entirety, which is prepared from the sintered element, can be increased. Also, since with the electrodeposition process, the paint can easily penetrate into a gap between the sintered element (the multipolar magnet) and the core metal, the bonding effect can be obtained between the sintered element and the core metal and, therefore, the multipolar magnet can be firmly retained by the core metal by the effects of staking and bonding. By way of example, even if the staking is loose, separation of the multipolar magnet from the core metal can be prevented by the bonding effect, resulting in increase of the product reliability. In addition, since the electrodeposition process is effective to form a uniform film as compared with that formed with the coating process and the impregnating process, control of the dimensions of the magnetic encoder as a product can be easily accomplished.

For the electrodeposition, two types are available, i.e. an anion type, in which the unitary component is connected to a plus pole and a cation type in which the unitary component is connected to a minus pole, but where an anticorrosion property is strongly desired as in, for example, automobile component parts, the cation type electrodeposition is rather desirable.

Also, at least one of a surface of the sintered element and a surface of the core metal which contacts the surface of the sintered element may be provided with a groove which facilitates the penetration of an electrodepositing paint into a gap between the sintered element and the core metal. Where the groove is employed, during process steps, in which the sintered element and the core metal are fixed together by staking and the electrodeposition is carried out subsequently, an electrodepositing paint can penetrate into the groove by the effect of electrophoresis and, then, during drying and baking process steps, the sintered element and the core metal are bonded together, resulting in increase of the bondability between the sintered element and the core metal.

The magnetic powder may be either a magnetic powder of a samarium system or a magnetic powder of a neodymium system. If the magnetic powder of either one of the samarium system or the neodymium system is used, a strong magnetic force can be obtained. The magnetic powder of the samarium system and the magnetic powder of the neodymium system may be employed in the form of a magnetic powder of samarium iron (SmFeN) and a magnetic powder of neodymium iron (NdFeB), respectively. Other than the above, the magnetic powder may be a gas atomized powder of manganese aluminum (MnAl).

The non-magnetic metallic powder may be a powder of tin. Where the magnetic powder is a powder of ferrite, a magnetic powder of the samarium system or the magnetic powder of the neodymium system, tin powder may be employed for the non-magnetic metallic powder.

The powdery mixture may contain two or more kinds of the magnetic powders or two or more kinds of the non-magnetic metallic powders. Also, the powdery mixture may contain two or more kinds of the magnetic powders and two or more kinds of the non-magnetic metallic powders. Where the powdery mixture contains two or more kinds of the magnetic powders or two or more kinds of the non-magnetic metallic powders, a desired characteristic can be obtained when a plurality of powders are mixed arbitrarily. By way of example, where the use of only the ferrite power does not result in a sufficient magnetic force, the ferrite powder may be mixed with a required amount of the magnetic powder of the samarium iron system and/or the magnetic powder of the neodymium iron system, which are a rare earth material, to increase the magnetic force and also to enable an inexpensive manufacture.

The wheel support bearing assembly of the present invention is equipped with the magnetic encoder of any one of the foregoing structures of the present invention. While the wheel support bearing assembly is generally used exposed to an environment of the road surface where the magnetic encoder is often soaked with muddy salt water, there is a high effect of preventing a rust from occurring in the magnetic encoder since the unitary component of the sintered element and the core metal in its entirety is surface treated to have the anticorrosion property.

Also, while it often occurs that particulates such as sand particulates may be trapped in between the magnetic encoder and the magnetic sensor held in face-to-face relation therewith, the following protection is available against this trapping. Specifically, the surface hardness of the multipolar magnet prepared from the sintered element made up of the magnetic powder and the non-magnetic metallic powder is high as compared with that in the conventional coder made of the elastic material or the elastomer containing the magnetic powder or the magnetic particulates. For this reason, in the wheel support bearing assembly incorporating the magnetic encoder for the detection of the number of revolutions of the vehicle wheel, even when the particulates such as the sand particles are trapped in between the surface of the multipolar magnet on the rotatable side and the surface of the magnetic sensor on the fixed side during the run of the automotive vehicle, there is a considerable effect of minimizing the abrasion damage to the multipolar magnet.

The wheel support bearing assembly of the present invention may utilize the magnetic encoder as a component part of the sealing device sealing the bearing space delimited between the inner and outer members. By way of example, this wheel support bearing assembly is operable to rotatably support a vehicle wheel relative to a vehicle body and includes an outer member having an inner peripheral surface formed with double rows of raceway surfaces, an inner member having an outer peripheral surface formed with double rows of raceway surfaces opposed to the raceway surfaces in the outer member, and double rows of rolling elements interposed between the opposed raceway surfaces. A sealing device for sealing the annular bearing space between the outer member and the inner member is disposed in this wheel support bearing assembly. One of component parts of this sealing device is rendered to be a magnetic encoder in this bearing assembly. In such case, the magnetic sealing device may include a first sealing plate of an L-sectioned configuration mounted on one of the outer member and the inner member, which is a rotatable member, and a second sealing plate of an L-sectioned configuration opposed to the first sealing plate and mounted on the other of the outer member and the inner member, which is a stationary member. A side sealing lip slidingly engageable with an upright portion of the first sealing plate and a radial sealing lip slidingly engageable with a cylindrical portion of the first sealing plate are fixed to the second sealing plate. The first sealing plate serves as a core metal of the magnetic encoder and a multipolar magnet is provided overlapped at least in part on the upright portion of the first sealing plate.

In the case of the wheel support bearing assembly of the foregoing construction, since one of the component parts of the sealing device is the magnetic encoder, the rotation of the vehicle wheel can be detected with a compact structure and without increasing the number of component parts used. Also, where the magnetic encoder forms a part of the sealing device as described above, trapping of, for example, sand particles in between the magnetic encoder and the magnetic sensor when exposed to the road surface environment will cause a problem. However, the frictional damage due to the trapping can be minimized because of the high surface hardness of the multipolar magnet. Since the magnetic encoder is surface treated to have an anticorrosion film, the sealing device incorporating the magnetic encoder shows the anticorrosion property. Also, an excellent sealing effect can be obtained because the side sealing lip and the radial sealing lip both secured to the second sealing plate slidingly engage the first sealing plate.

The first sealing plate may be of, for example, a generally Z-sectioned configuration and be made up of a first cylindrical portion, which is mounted on the rotatable member, an upright portion and a second cylindrical portion. Where the sealing plate is of a generally inverted Z-sectioned configuration, the second cylindrical portion can be utilized for fixing by staking the sintered element to the first sealing plate and the fixing of the sintered element by staking can easily be accomplished.

Where the first sealing plate is so configured as to have a generally inverted Z-shaped section or an L-shaped section, any of the following constructions may be employed for the first sealing plate. It is, however, to be noted that the use of a second cylindrical portion formed at an outer diametric edge of the first sealing plate is limited only to the first sealing plate of the generally inverted Z-shaped section.

The upright portion of the first sealing plate may be axially stepped to define an inner peripheral portion and an outer peripheral portion offset axially from the inner peripheral portion.

The multipolar magnet may be fixed to the upright portion of the first sealing plate by staking the second cylindrical portion of the first sealing plate.

The second cylindrical portion may be plastically deformed at circumferential locations to form plastically deformed portions which protrude in a radial direction towards an inner diametric side of the first sealing plate. The multipolar magnet overlapped on the upright portion of the first sealing plate may be fixed by the plastically deformed portions.

The multipolar magnet may be fixed to the upright portion of the first sealing plate by plastically deforming pawl-shaped projections provided in the outer diametric edge of the first sealing plate.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1A:
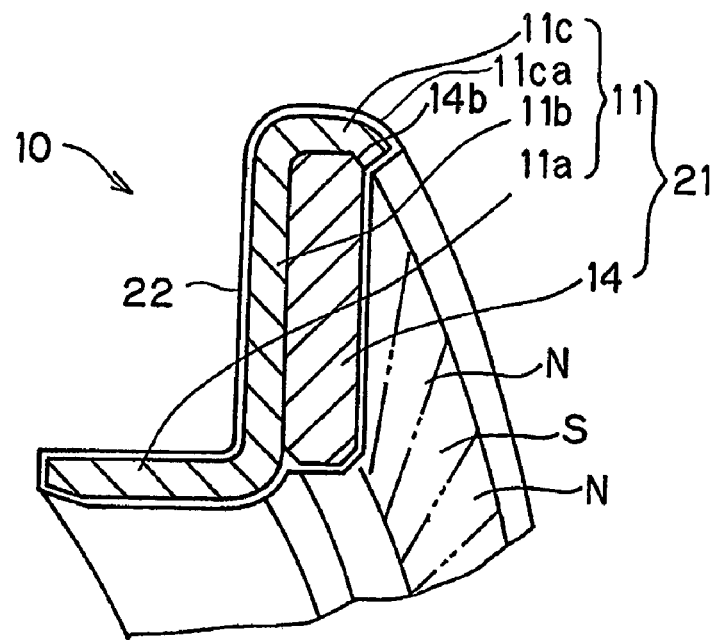
FIG. 1A is a fragmentary perspective view of a magnetic encoder according to a first preferred embodiment of the present invention.
Figure 1B:
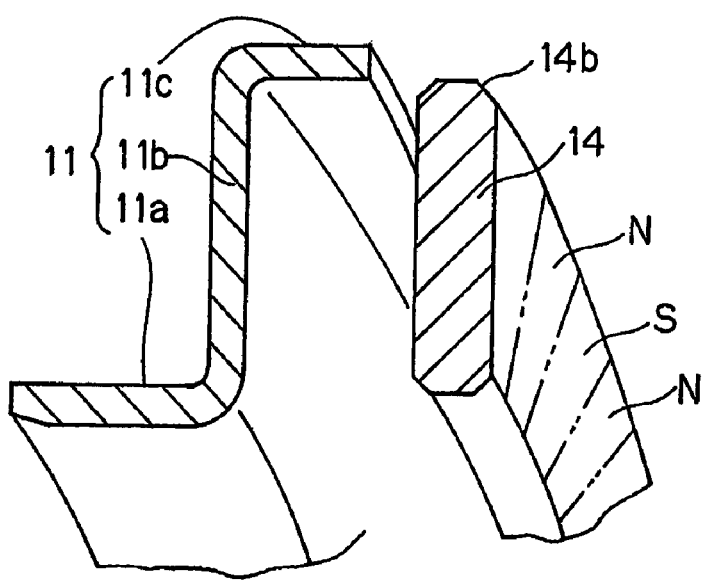
FIG. 1B is a fragmentary perspective view showing a process of assemblage of the magnetic encoder.
Figure 2:
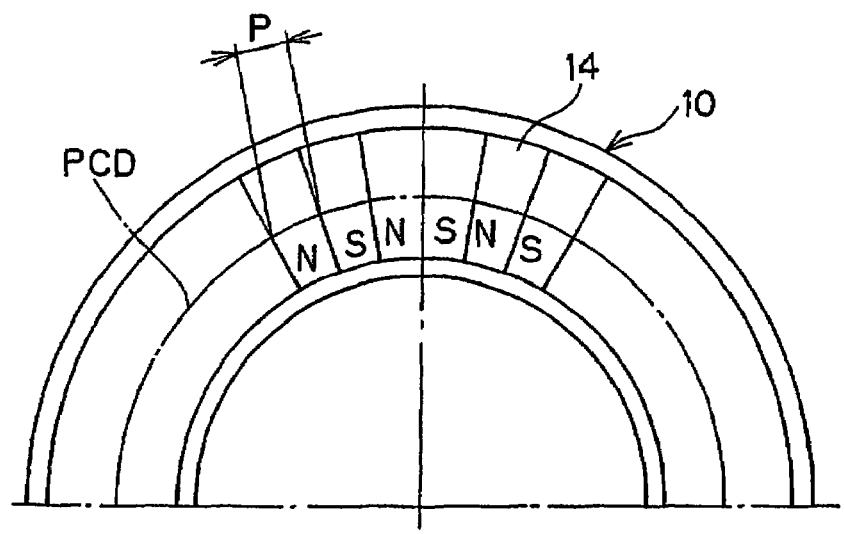
FIG. 2 is an explanatory diagram showing magnetic poles with the magnetic encoder as viewed from front.

A first preferred embodiment of the present invention will now be described with particular reference to FIGS. 1 to 3. As shown in FIG. 1, a magnetic encoder 10 of the first embodiment includes an annular core metal 11 made of a metallic material, and a multipolar magnet 14 provided on a surface of the core metal 11 so as to extend circumferentially of the core metal 11. The multipolar magnet 14 is a member circumferentially magnetized to have a plurality of alternating magnetic poles N and S deployed in a direction circumferentially thereof and is in the form of a multipolar magnetized magnetic disc. The alternating magnetic poles N and S are so formed as to have a predetermined pitch p along the pitch circle diameter PCD (FIG. 2). This multipolar magnet 14 is a sintered element formed by sintering a powdery mixture of a magnetic metallic powder and a non-magnetic metallic powder and is fixed to the core metal 11 by staking the core metal 11.

The core metal 11 and the sintered element fixed to the core metal 11 form a sintered element-core metal unitary component 21 and this unitary component 21 is formed with a anticorrosion film 22 which is applied in accordance with a surface treatment for corrosion prevention. This magnetic encoder 10 is fitted to a rotatable member (not shown) and is used for the detection of rotation of the rotatable member while a magnetic sensor 15 is held in face-to-face relation with the multipolar magnet 14 as shown in FIG. 3. Hence, the magnetic encoder 10 and the magnetic sensor 15 altogether form a rotation detecting device 20. FIG. 3 illustrates an example of application of the magnetic encoder 10, in which the magnetic encoder 10 is used as a component part of a sealing device 5 of a bearing assembly (not shown) and is fitted to a rotatable member of the bearing assembly. The sealing device 5 includes the magnetic encoder 10 and a stationary sealing member 9. The details of the sealing device 5 will be described later.

The magnetic powder to be mixed in the multipolar magnet 14 may be, for example, an isotropic or anisotropic ferrite powder of barium system, or an isotropic or anisotropic ferrite powder of strontium system. The ferrite powder may be in the form of particulates of ferrite or a pulverized powder of wet type anisotropic ferrite core. Where the pulverized powder of wet type anisotropic ferrite core is used as the magnetic powder, it is necessary to render a powdery mixture of the magnetic powder with the non-magnetic metallic powder to be an anisotropic green compact formed in the magnetic field.

The magnetic powder may be a magnetic material of a rare earth system. By way of example, the magnetic powder may be a magnetic powder of either one of a samarium iron system (SmFeN) and a neodymium iron system (NdFeB). Also, the magnetic powder may be a gas atomized powder of manganese aluminum (MnAl).

Also, the magnetic powder may be a mixture of two or more kinds of the magnetic powders of the samarium iron system (SmFeN), the magnetic powder of the neodymium iron system (NdFeB) and the gas atomized powder of the manganese aluminum (MnAl). For example, a mixture of the magnetic powder of the samarium iron system (SmFeN) and the magnetic powder of the neodymium iron system (NdFeB), a mixture of the gas atomized powder of the manganese aluminum (MnAl) and the magnetic powder of the samarium iron system, or a mixture of the magnetic powder of the samarium iron system, the magnetic powder of the neodymium iron system (NdFeB) and the gas atomized powder of the manganese aluminum (MnAl) may be equally employed as the magnetic powder. Where the sole use of the ferrite powder does not result in a sufficient magnetic force, the ferrite powder may be mixed with a required amount of the magnetic powder of the samarium iron (SmFeN) system and/or the magnetic powder of the nedodymium iron (NdFeB) system to increase the magnetic force and also to enable an inexpensive manufacture.

The non-magnetic metallic powder, which forms a part of the multipolar magnet 14, may be employed in the form of a powder of, or a powdery mixture of, zinc, copper, aluminum, nickel, tin, tungsten, manganese and a non-magnetic stainless steel material, or a powdery alloy of two or more of them.

The metallic material used to form the core metal 11 may be a magnetic material, preferably a ferromagnetic material, for example, a steel plate, which is a magnetic material and has a rust resistant property. For the steel plate, a stainless steel plate of a ferrite system (for example, SUS430 according to the Japanese Industrial Standards) or a rolled steel plate treated to have a rust resistant property can be suitably employed.

With respect to the shape of the core metal 11, it may be one of various annular shapes, provided that the core metal 11 is of a shape sufficient to fix the multipolar magnet 14. In particular, the core metal 11 is preferably of a shape sufficient to accomplish a mechanical fixing, for example, a fixing by staking or a fixing by engagement. In the case of the fixing by staking, the core metal 11 may, for example, be of an annular shape having a sectional shape generally similar to the shape of an inverted figure of "Z", which is defined by a first cylindrical portion 11a on an inner diametric side, which defines a mounting side, an upright portion 11b protruding from one end of the cylindrical portion 11a in a radially outward direction, and a second cylindrical portion 11c protruding from an outer diametric edge of the upright portion 11b in an axial direction, as shown in FIG. 1B. It is to be noted that the core metal 11 may have a L-sectioned shape, in which case the second cylindrical portion 11c of the core metal 11 of the structure shown in FIG. 1B is dispensed with. Where the core metal 11 is designed to have the L-sectioned shape, the upright portion 11b is provided with, for example, pawls to achieve the fixing of the magnet 14 by staking the pawls.

In the core metal 11 shown in FIG. 1B, the first cylindrical portion 11a, the upright portion 11b and the second cylindrical portion 11c are of one-piece construction formed integrally from a metallic plate such as a steel plate by the use of a press work. The upright portion 11b is formed flat and, after an unmagnetized sintered element, i.e., a sintered element having not yet been magnetized, of the multipolar magnet 14 has been incorporated as overlapped on a surface of the flat upright portion 11b and when the second cylindrical portion 11c at the outer peripheral edge of the upright portion 11b is subsequently staked, the multipolar magnet 14 is fixed to the upright portion 11b of the core metal 11 in overlapping relation therewith to complete the unitary component 21 of the sintered element and the core metal. A free end portion of the second cylindrical portion 11c or the second cylindrical portion 11c in its substantially entirety, as viewed in section thereof, forms a staked portion. Also, this staked portion extends over the entire circumference of the core metal 11 and does therefore represent an annular shape. A portion of the multipolar magnet 14, which is fixed by the second cylindrical portion 11c is defined by a recessed portion 14b depressed inwardly from a surface of the multipolar magnet 14, which defines a to-be-detected surface and, accordingly, a plastically deformed portion 11ca of the second cylindrical portion 11c does not protrude onto the to-be-detected surface of the multipolar magnet 14.

Figure 4:
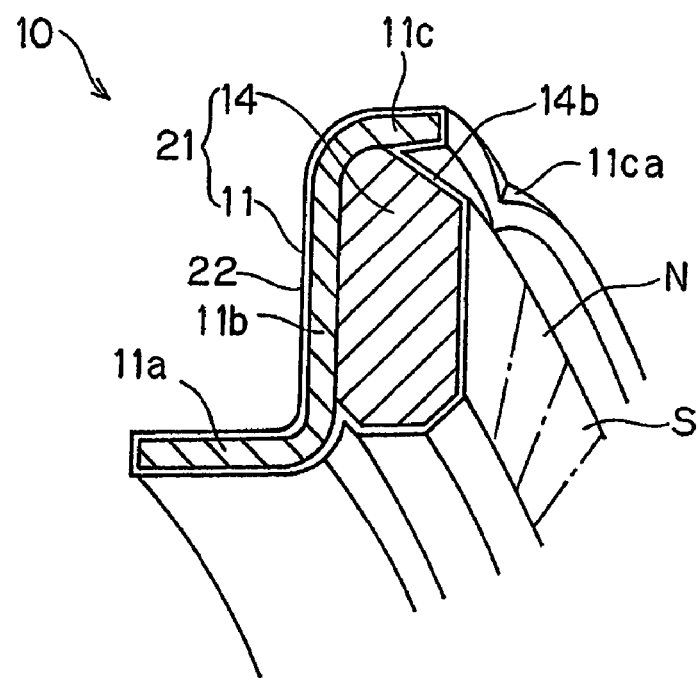
FIG. 4 is a perspective view showing a rear surface of a multipolar magnet of one example used in the magnetic encoder.
Figure 5:
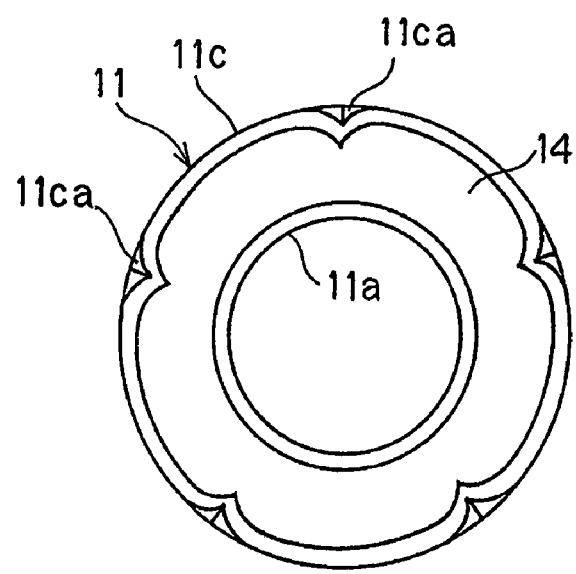
FIG. 5 is a perspective view showing a rear surface of the multipolar magnet of another example used in the magnetic encoder.

The fixing by staking, other than that worked on the entire circumference as described above, may be carried out in a manner as shown in sectional and front elevations views of FIGS. 4 and 5, respectively. In this example, the core metal 11 is, as is the case with that shown in FIG. 1, of an annular, inverted Z-sectioned shape including the cylindrical portion 11a, the upright portion 11b and the second cylindrical portion 11c. Also, the second cylindrical portion 11c is staked at circumferential locations by means of a staking technique to form plastically deformed portions 11ca which protrude in a radial direction towards an inner diametric side of the core metal 11, so that the multipolar magnet 14 can be secured to the upright portion 11b of the core metal 11 by means of the plastically deformed portions 11ca. Even in this example, a portion of the multipolar magnet 14, which is fixed by the plastically deformed portions 11ca of the second cylindrical portion 11c, is defined by a recessed portion 14b depressed inwardly from a surface of the multipolar magnet 14, which defines a to-be-detected surface and, accordingly, the plastically deformed portions 11ca do not protrude onto the to-be-detected surface of the multipolar magnet 14. The recessed portion 14b has an inclined face inclined from the to-be-detected surface towards a rear surface thereof in a direction towards an outer diametric side of the core metal 11.

Figure 6:
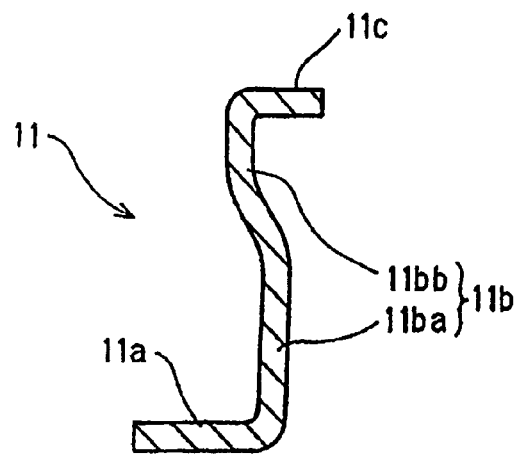
FIG. 6 is a fragmentary perspective view showing one example of a core metal employed in the magnetic encoder.

In each of the examples shown in FIGS. 1 and 4, respectively, the core metal 11 may be so designed as to have an axially stepped configuration, in which as shown in FIG. 6, the upright portion 11b is made up of an inner peripheral portion 11ba and an outer peripheral portion 11bb continued from but offset axially from the inner peripheral portion 11ba. In FIG. 6, although not shown, the multipolar magnet 14 is, as is the case with the example shown in FIG. 1, arranged on a surface of the upright portion 11b, where the second cylindrical portion 11c protrudes.

Figure 7A:
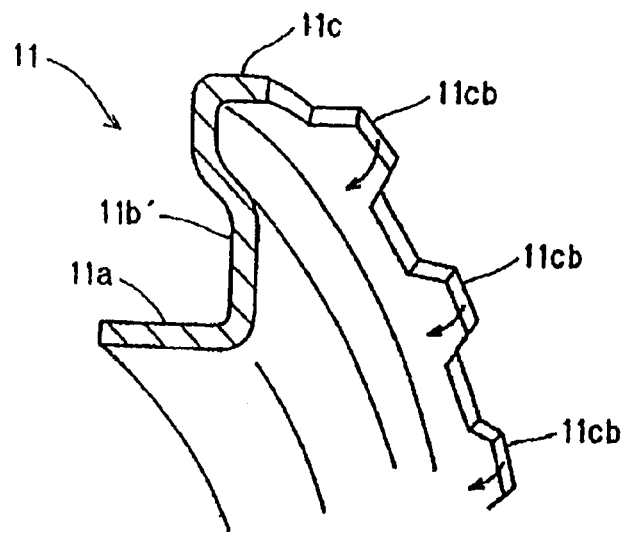
FIG. 7A is a fragmentary perspective view showing another example of the core metal employed in the magnetic encoder.
Figure 7B:
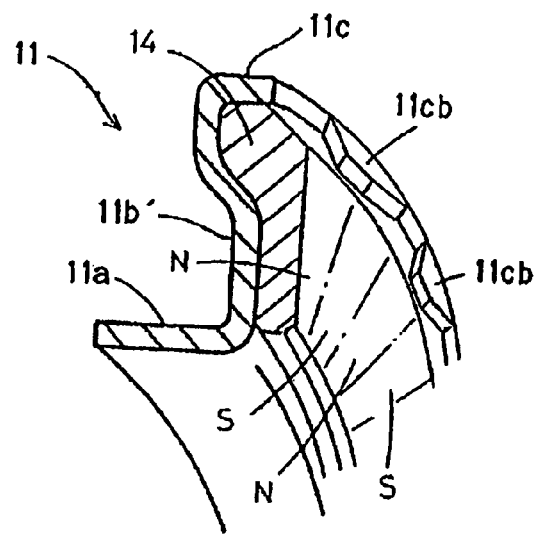
FIG. 7B is a fragmentary perspective view showing the magnetic encoder using the core metal of FIG. 7A.

Yet, as shown in FIG. 7A, in the core metal 11 of annular, inverted Z-sectioned shape as is the case with that in the example shown in FIG. 1, pawl-shaped projections 11cb may be provided at a corresponding number of circumferential locations of a free end of the second cylindrical portion 11c so that the multipolar magnet 14 can be secured to the core metal 11 as shown in FIG. 7B when the pawl-shaped projections 11cb are plastically deformed, that is, bent by staking, in a radial direction towards the inner diametric side of the core metal 11 as shown by the arrow. The multipolar magnet 14 is arranged on the surface of the upright portion 11b, where the second cylindrical portion 11c protrudes, as is the case with that in the example shown in FIG. 1. Even in this example, as is the case with the example shown in FIG. 6, the upright portion 11b is of an axially stepped configuration. Where the upright portion 11b is designed to have an axially stepped configuration, the rear surface of the multipolar magnet 14 on the side of the upright portion 11b may be so shaped as to conform to the shape of the axially stepped configuration of the upright portion 11b as shown in FIG. 7B.

The magnetic encoder 10 can be obtained when the unitary component 21 of the sintered element and the core metal, in which the multipolar magnet 14 is secured to the core metal 11 by staking, is formed with the anticorrosion film 22 by means of an electrodeposition technique. The electrodeposition of the anticorrosion film 22 in this case is performed by supplying an electric current to the unitary component 21 then immersed in a water soluble paint, so that the anticorrosion film 22 can be coated on the surface of the unitary component 21 electrochemically by an electrophoresis process. The electrodeposition process is broadly classified into an anion electrodeposition, in which the unitary component 21 is electrically connected to a plus polarity, and a cation electrodeposition, in which the unitary component 21 is electrically connected to a minus polarity. Where the magnetic encoder 10 is mounted in a wheel support bearing assembly, the use of the cation electrodeposition process is preferred to form the anticorrosion film 22 since the magnetic encoder 10 mounted in the wheel support bearing assembly is required to have an anticorrosion property. In any event, the anticorrosion film 22 so formed as an electrodeposition coating by the electrodeposition preferably contains a water content not higher than 10% and formation of the anticorrosion film 22 is finalized by drying and baking.

The electrodeposition process has such a merit that it can give rise to a good uniformity of the film thickness as compared with that obtained with a solvent painting and, also, a good adhesion of the coating material and, therefore, it can be utilized to achieve a uniform coating of even an article having considerable surface irregularities. Also, if a masking technique is employed in the practice of the electrodeposition process, a two-color coating can easily be accomplished by a combined use of the electrodeposition coating and plating methods or by twice repeating the electrodeposition method. For this reason, the electrodeposition process can satisfactorily coat end face portions, which cannot be relatively easily coated with the currently available clear paint of a modified epoxy system by means of a dipping technique or a spray coating technique, with the coatability on such end face portions increased considerably.

Also, with the electrodeposition method, the electrodepositing paint acts as a bonding agent between the sintered element (the multipolar magnet 14) and the core metal 11 because by the effect of the electrophoresis of the electrodepositing material the paint adheres to and penetrates into the staked portion of the unitary component 21 where the plastically deformed portions 11ca contact the recessed portion 14a and also an inner diameter portion of the unitary component 21 where an inner peripheral surface of the sintered element and an inner peripheral surface of the first cylindrical portion 11a are positioned adjacent each other and, therefore, as compared with the dipping or spray technique, by which the currently available clear paint of a modified epoxy system is coated, the adhesion between the sintered element (the multipolar magnet 14) and the core metal 11 can be considerably increased.

Figure 8:
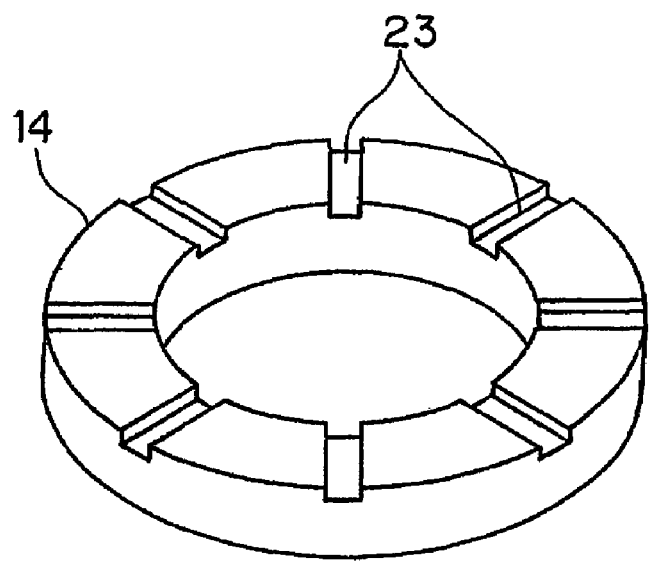
FIG. 8 is a fragmentary perspective view showing a further example of the core metal used in the magnetic encoder.
Figure 9:
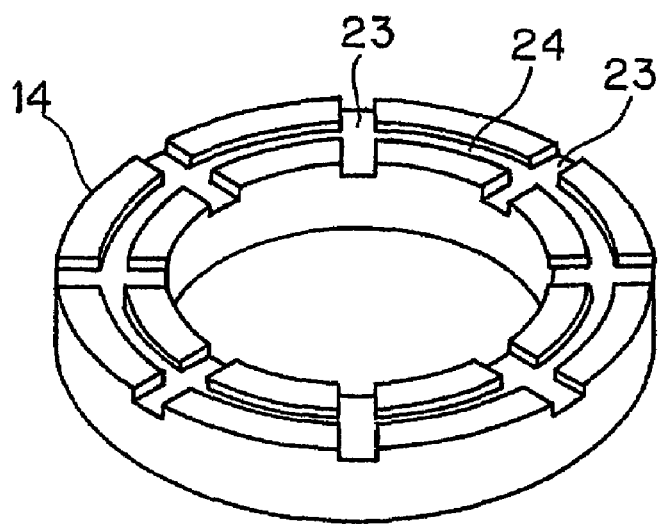
FIG. 9 is a fragmentary perspective view of the magnetic encoder according to a second preferred embodiment of the present invention.

Also, if desired to enhance the adhesion between the sintered element (the multipolar magnet 14) and the core metal 11 in the unitary component 21, the rear surface of the sintered element (the multipolar magnet 14), which is held in contact with the core metal 11, may be formed with a plurality of grooves 23 or 24 as shown in FIG. 8 or FIG. 9, respectively, so that the aqueous electrodepositing paint can flow through those grooves 23 or 24. In the example shown in FIG. 8, a plurality of radial grooves 23 extending radially are formed in the rear surface of the sintered element, whereas in the example shown in FIG. 9, a plurality of radial grooves 23 and ring-shaped grooves 24 coaxial with the sintered element (the multipolar magnet 14) and crossing the radial grooves 23 are formed in the rear surface of the sintered element.

Formation of the grooves 23 and/or 24 in the rear surface of the sintered element (the multipolar magnet 14) allows the aqueous electrodepositing paint to penetrate into those grooves 23 and/or 24 by the effect of the electrophoresis during the execution of the electrodeposition and, then, allows the sintered element (the multipolar magnet 14) and the core metal 11 to be bonded to each other by the electrodepositing paint during the subsequent drying and baking.

Figure 10:
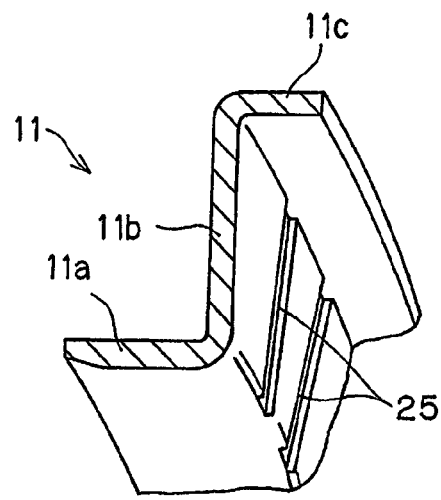
FIG. 10 is a front elevational view of the magnetic encoder of FIG. 9.
Figure 11:
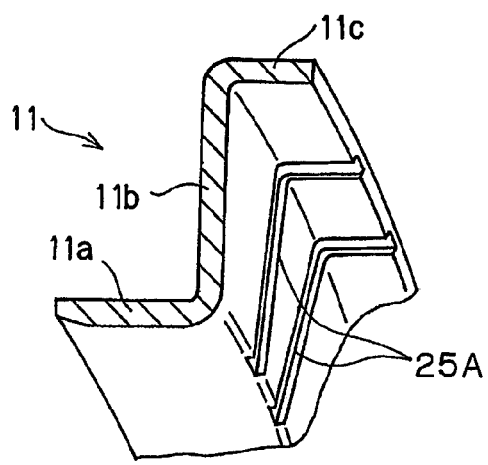
FIG. 11 is a fragmentary sectional view showing a modified form of the core metal.
Figure 12:
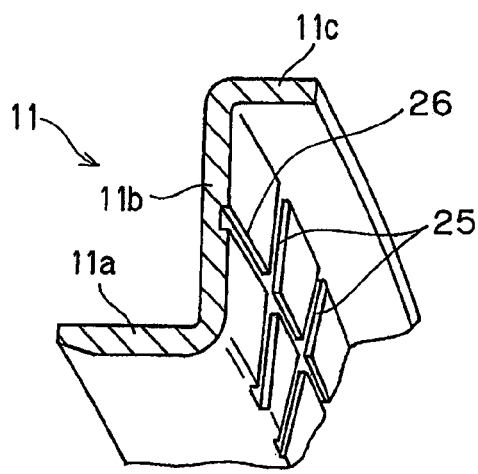
FIG. 12 is a fragmentary perspective view showing another modified form of the core metal.

While with reference to FIGS. 8 and 9 the grooves 23 and 24 have been described and shown as formed on the rear surface of the sintered element (the multipolar magnet 14), similar grooves 25, 25A, 26 may be formed in the surface of the core metal 11 so as to extend in the surface of the upright portion 11b or extend from the surface of the upright portion 11b to the inner peripheral surface of the second cylindrical portion 11c to allow penetration of the water-soluble electrodepositing material into those grooves 25, 25A, 26. In the example shown in FIG. 10, a plurality of radial grooves 25 are formed in one of the opposite annular surfaces of the upright portion 11b, which is held in contact with the sintered element (the multipolar magnet 14), so as to extend in the radial direction by means of a press work or a machining technique. In the example shown in FIG. 11, a plurality of radial grooves 25A are formed in part in that annular surface of the upright portion 11b and in part in an inner peripheral surface of the second cylindrical portion 11c so as to straddle from the upright portion 11b to the second cylindrical portion 11c by means of a similar press work or a machining technique. In the example shown in FIG. 12, a plurality of radial grooves 25 and ring-shaped grooves 26, which are concentric with the core metal 11 and crossing the radial grooves 25, are formed in that annular surface of the upright portion 11b by means of a press work or a machining technique.

Figure 3:
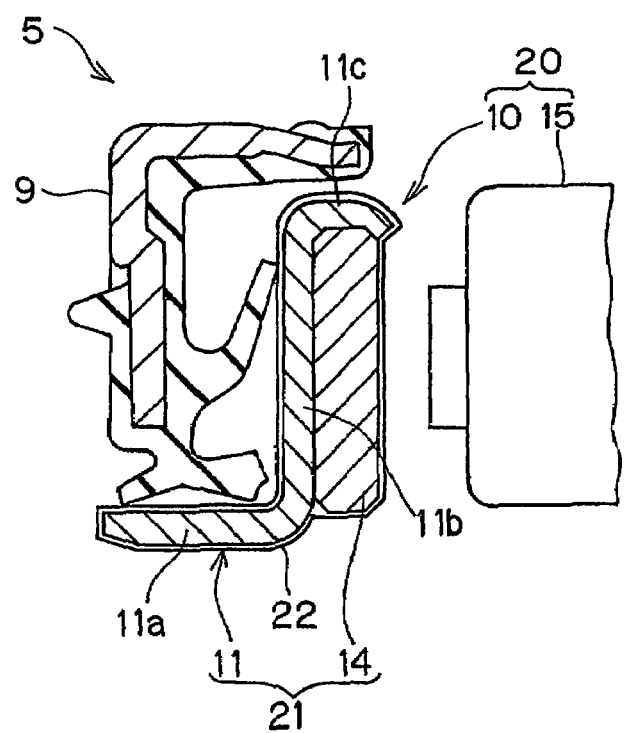
FIG. 3 is a fragmentary cutout front elevational view showing a magnetic sensor and a sealing device provided with the magnetic encoder.

The magnetic encoder 10 of the structure hereinbefore described is used for detecting the number of revolutions while the magnetic sensor 15 is disposed in face-to-face relation with the multipolar magnet 14 as hereinbefore described with particular reference to FIG. 3. When the magnetic encoder 10 is rotated, passage of the alternating magnetic poles N and S in the multipolar magnet 14 can be detected by the magnetic sensor 15, and the rotation can be detected in the form of a train of pulse. Since the pitch p (FIG. 2) of the poles N and S can be defined to a small value and, for example, the pitch p can be set to 1.5 mm with the precision of ±3% of a single pitch deviation, the rotation detection with a high accuracy is possible. The term "single pitch deviation" means the ratio, relative to a target pitch, of the difference in pitch p between the magnetic poles detected at the position spaced a predetermined distance from the magnetic encoder 10. Where the magnetic encoder 10 is employed in the sealing device 5 of the bearing assembly as shown in FIG. 3, the number of revolutions of the bearing assembly, on which the magnetic encoder 10 is mounted, can be detected.

Since the surface treatment for anticorrosion purpose is applied to the unitary component 21 of the sintered element 14 and the core metal 11, in which the multipolar magnet 14, which is the sintered element, is fixed by staking to the core metal 11, the magnetic encoder 10 can have an excellent anticorrosion property and can remain free from problems associated with the occurrence of rusting during the use thereof for a long period of time under the severe environment. By way of example, the magnetic encoder 10 can be used under the severe environment when mounted in, for example, the wheel support bearing assembly.

Also, since the multipolar magnet 14 is prepared from the sintered element mixed with the magnetic powder, the magnetic encoder 10 can be manufactured compact in size and has an excellent wear resistance property and a high productivity while capable of exerting a magnetic force required to achieve a stabilized sensing, as will be discussed later.

In addition, the multipolar magnet 14 has a surface hardness, which is higher than the conventional coder utilizing a resilient material or an elastomer containing a powder of magnetic material or magnetic particles. Therefore, where the multipolar magnet 10 is used in the rotation detecting device 20 for detecting the number of revolutions of, for example, a vehicle wheel, and even when particulate matter such as sand particles is trapped into a gap between the surface of the multipolar magnet 14 on a rotating side and the surface of the magnetic sensor 15 on a stationary side during run of the automotive vehicle, the multipolar magnet 14 is less susceptible to frictional wear and damage than the conventional magnet prepared of the elastic material.

Summarizing particularly characteristic advantages of this embodiment, they are as follows;

Since the electrodeposition process provides a good adhesion as compared with the coating process, the product as a whole can be coated and, therefore, the anticorrosion property of the sintered element (the multipolar magnet 14) can be increased advantageously.

Since the electrodeposition process provides a good adhesion as compared with the coating process, penetration of the electrodepositing material into a gap between the sintered element (the multipolar magnet 14) and the core metal 11 takes place easily to exhibit a bonding effect between the sintered element and the core metal. By means of "staking" and "bonding", the sintered element and the core metal can be retained. Even though the staking is insufficient and loose, the bonding effect act to avoid a separation between the sintered element and the core metal and, therefore, the reliability of the product can be increased.

As compared with the coating process, the electrodeposition process is effective to provide a paint film of a uniform film thickness and, therefore, the products can easily controlled as to their dimensions.

If one or both of the sintered element (the multipolar magnet 14) and the core metal 11 is formed with the grooves, the adhesion between the sintered element and the core metal can further be increased.

Hereinafter, results of tests conducted to determine the anticorrosion performance of the anticorrosive film 22 formed by the electrodeposition process as hereinabove described will be discussed with reference to Table 1. The tests were conducted using various samples, which are respective bases for Examples 1 to 10 of the foregoing embodiments and Comparative Examples 1 to 10, respectively. The samples which utilized the magnetic powder of the samarium iron (Sm—Fe—N) system and the samples which utilized the magnetic powder of the neodymium iron (Nd—Fe—B) system were prepared. For the binder, Sn was used in any of those samples. Specific magnetic powders used and the mixing ratios in those samples are shown in Table 1. Using those mixing ratio, green compacts (powder compacts not yet sintered), each 54 mm. dia.×66 mm. dia.×1.5 mm in thickness were molded by a pressure press and were baked for one hour under the atmosphere. Respective shapes of the sintered element (the multipolar magnet 14) and the core metal 11 in each of those samples are such as shown in the figures of the accompanying drawings, which are specified in Table 1 using the same figure numbering. In each of the samples used in Examples 1 to 10, the unitary component 21 of the sintered element and the core metal was treated with the electrodeposition to form the respective anticorrosion film 22. In contrast thereto, in each of the samples used in Comparative Examples 1 to 10, various painting such as epoxy coating and epoxy impregnation were carried out.

Those samples were subjected to the following tests.

(1) Each of the samples was immersed for 24 hours in a 5% solution of NaCl heated to 55° C. and the anticorrosion performance was then compared. In Table 1, the anticorrosion performance is ranked in the order of oo, o, Δ and X with oo representing the excellent anticorrosion performance.

(2) Where each of the samples, which is treated to have an anticorrosion or antirusting property, is to be used as a product, the flatness of the surface of each of the sintered element (the multipolar magnet 14) and the core metal 11 is important and, if the flatness is low, there is the possibility that the detecting sensitivity of the rotation detecting device 20 will be lowered. In view of this, the surface shape was measured and, in Table 1, o and X are marked if the surface roughness Rz, which is a result of the measurement, is smaller and greater than 50 μm, respectively.

(3) In order to evaluate the bondability between the sintered element (the multipolar magnet 14) and the core metal 11, a jig made of iron was inserted in a gap between the sintered element and the core metal 11 to forcibly separate the sintered element from the core metal 11. If the bondability is good, no exfoliation take place at the interface between the sintered element (the multipolar magnet 14) and the core metal 11 and breakage take place inside the sintered element and, therefore, the amount of the paint film remaining on the surface of the core metal 11 is large. In Table 1, the amount of deposit of the paint remaining on the surface of the core metal 11 is ranked in the order of oo, o, Δ and X with oo representing the largest amount of deposit.

TABLE 1

Examples

| | Composition (wt %) | | | Shape of | | Anticorrosion Treatment | Anticorrosion Property | | | |
|---|---|---|---|---|---|---|---|---|---|---|
| | Mag. Powder | | Binder | Sintered | Shape of | (Electro- | Surface of Sintered | Inner Dia. Surface of Sintered | Film Flat- | Bond |
| Exp. | Sm—Fe—N | Nd—Fe—B | Sn | Element | Core Metal | deposition) | Element | Element | ness | ability |
| 1 | 60 | | 40 | FIG. 1 | FIG. 1 | Cation | oo | oo | o | o |
| 2 | 60 | | 40 | FIG. 1 | FIG. 1 | Anion | o | o | o | o |
| 3 | | 60 | 40 | FIG. 1 | FIG. 1 | Cation | oo | oo | o | o |
| 4 | 60 | | 40 | FIG. 8 | FIG. 1 | Cation | oo | oo | o | oo |
| 5 | 60 | | 40 | FIG. 9 | FIG. 1 | Cation | oo | oo | o | oo |
| 6 | 60 | | 40 | FIG. 1 | FIG. 10 | Cation | oo | oo | o | oo |
| 7 | 60 | | 40 | FIG. 1 | FIG. 11 | Cation | oo | oo | o | oo |
| 8 | 60 | | 40 | FIG. 1 | FIG. 12 | Cation | oo | oo | o | oo |
| 9 | 60 | | 40 | FIG. 8 | FIG. 10 | Cation | oo | oo | o | oo |
| 10 | 60 | | 40 | FIG. 9 | FIG. 12 | Cation | oo | oo | o | oo |

Comparative Examples

| | Composition (wt %) | | | Shape of | | Anticorrosion Treatment | Anticorrosion Property | | | |
|---|---|---|---|---|---|---|---|---|---|---|
| Com | Mag. Powder | | Binder | Sintered | Shape of | | Surface of Sintered | Inner Dia. Surface of Sintered | Film Flat- | Bond |
| Exp. | Sm—Fe—N | Nd—Fe—B | Sn | Element | Core Metal | Treatment | Element | Element | ness | ability |
| 1 | 60 | | 40 | FIG. 1 | FIG. 1 | Epoxy Coated | oo | X | o | X |
| 2 | 60 | | 40 | FIG. 1 | FIG. 1 | Epoxy Impregnated | o | o | X | Δ |
| 3 | | 60 | 40 | FIG. 1 | FIG. 1 | Epoxy Impregnated | o | o | X | Δ |
| 4 | 60 | | 40 | FIG. 8 | FIG. 1 | Epoxy Impregnated | o | o | X | Δ |
| 5 | 60 | | 40 | FIG. 9 | FIG. 1 | Epoxy Impregnated | o | o | X | Δ |
| 6 | 60 | | 40 | FIG. 1 | FIG. 10 | Epoxy Impregnated | o | o | X | Δ |
| 7 | 60 | | 40 | FIG. 1 | FIG. 11 | Epoxy Impregnated | o | o | X | Δ |
| 8 | 60 | | 40 | FIG. 1 | FIG. 12 | Epoxy Impregnated | o | o | X | Δ |
| 9 | 60 | | 40 | FIG. 8 | FIG. 10 | Epoxy Impregnated | o | o | X | Δ |
| 10 | 60 | | 40 | FIG. 9 | FIG. 12 | Epoxy Impregnated | o | o | X | Δ |

The details of each of Examples 1 to 10 referred to in Table 1 are as follows and the following can also be understood from the results of the tests shown in Table 1.

EXAMPLE 1

The magnetic powder of the Sm—Fe—N system was used for the sintered element (the multipolar magnet 14), and cation electrodeposition was applied to the unitary component 21 of the sintered element and the core metal, having no grooves formed in each of the sintered element and the core metal 11. Example 1 shows that the anticorrosion property, the flatness and the bondability were excellent.

EXAMPLE 2

The magnetic powder of the Sm—Fe—N system was used for the sintered element (the multipolar magnet 14), and anion electrodeposition was applied to the unitary component 21 having no grooves formed in each of the sintered element and the core metal 11. Example 2 shows that the flatness and the bondability were excellent although the anticorrosion property is somewhat low as compared with that with the cation electrodeposition.

EXAMPLE 3

The magnetic powder of the Nd—Fe—B system was used for the sintered element (the multipolar magnet 14), and cation electrodeposition was applied to the unitary component 21 having no grooves formed in each of the sintered element and the core metal 11. Example 3 shows that the anticorrosion property, the flatness and the bondability were excellent.

EXAMPLES 4 TO 10

Cation electrodeposition was applied to the unitary components 21 having the grooves formed in one or both of the sintered element (the multipolar magnet 14) and the core metal 11. Each of Examples 4 to 10 shows that the anticorrosion property, the flatness and the bondability were excellent. In particular, the bondability was considerably excellent.

COMPARATIVE EXAMPLE 1

The magnetic powder of the Sm—Fe—N system was used for the sintered element (the multipolar magnet 14), and the unitary component 21 having no groove formed in any of the sintered element and the core metal 11 was coated with the clear paint of the epoxy system to form the film, which was subsequently baked for 20 minutes at 180° C. In this example, although the anticorrosion property of the surface of the sintered element and the flatness was good, the bondability was low with reduction in the anticorrosion property of an inner diametric portion of the unitary component 21 where deposition was difficult to achieve.

COMPARATIVE EXAMPLE 2

The magnetic powder of the Sm—Fe—N system was used for the sintered element (the multipolar magnet 14), and the unitary component 21 having no groove formed in any of the sintered element and the core metal 11 was coated to form the film, by preparing a thinner-diluted solution of the clear paint of the epoxy system (TPR-RC Clear, available from Tokyo Paint Co., Ltd.), immersing the unitary component 21 into the thinned solution, vacuuming an ambient air surrounding the unitary component 21 to allow the resin to forcibly penetrate into a gap between the sintered element and the core metal 11, and baking the sintered element, removed from the solution, for 20 minutes at 180° C. after the resin-impregnated unitary component had been immersed in the solution for a predetermined time. In this example, although the anticorrosion property was good, the flatness was low and the bondability was worse than that afforded by the electrodeposition.

COMPARATIVE EXAMPLE 3

The magnetic powder of the Nd—Fe—B system was used for the sintered element (the multipolar magnet 14), and the unitary component 21 having no groove formed in any of the sintered element and the core metal 11 was coated to form the film, by preparing a thinner-diluted solution of the clear paint of the epoxy system (TPR-RC Clear, available from Tokyo Paint Co., Ltd.), immersing the unitary component 21 into the thinned solution, vacuuming an ambient air surrounding the unitary component 21 to allow the resin to forcibly penetrate into a gap between the sintered element and the core metal 11, and baking the sintered element, removed from the solution, for 20 minutes at 180° C. after the resin-impregnated unitary component had been immersed in the solution for a predetermined time. In this example, although the anticorrosion property was good, the flatness was low and the bondability was worse than that afforded by the electrodeposition.

COMPARATIVE EXAMPLES 4 TO 10

The magnetic powder of the Sm—Fe—N system was used for the sintered element (the multipolar magnet 14) and the unitary component 21 having the grooves formed in one or both of the sintered element and the core metal 11 was coated to form the film, by preparing a thinner-diluted solution of the clear paint of the epoxy system (TPR-RC Clear, available from Tokyo Paint Co., Ltd.), immersing the unitary component 21 into the thinned solution, vacuuming an ambient air surrounding the unitary component 21 to allow the resin to forcibly penetrate into a gap between the sintered element and the core metal 11, and baking the sintered element, removed from the solution, for 20 minutes at 180° C. after the resin-impregnated unitary component had been immersed in the solution for a predetermined time. In this example, although the anticorrosion property was good, the flatness was low and the bondability was worse than that afforded by the electrodeposition.

Figure 13:
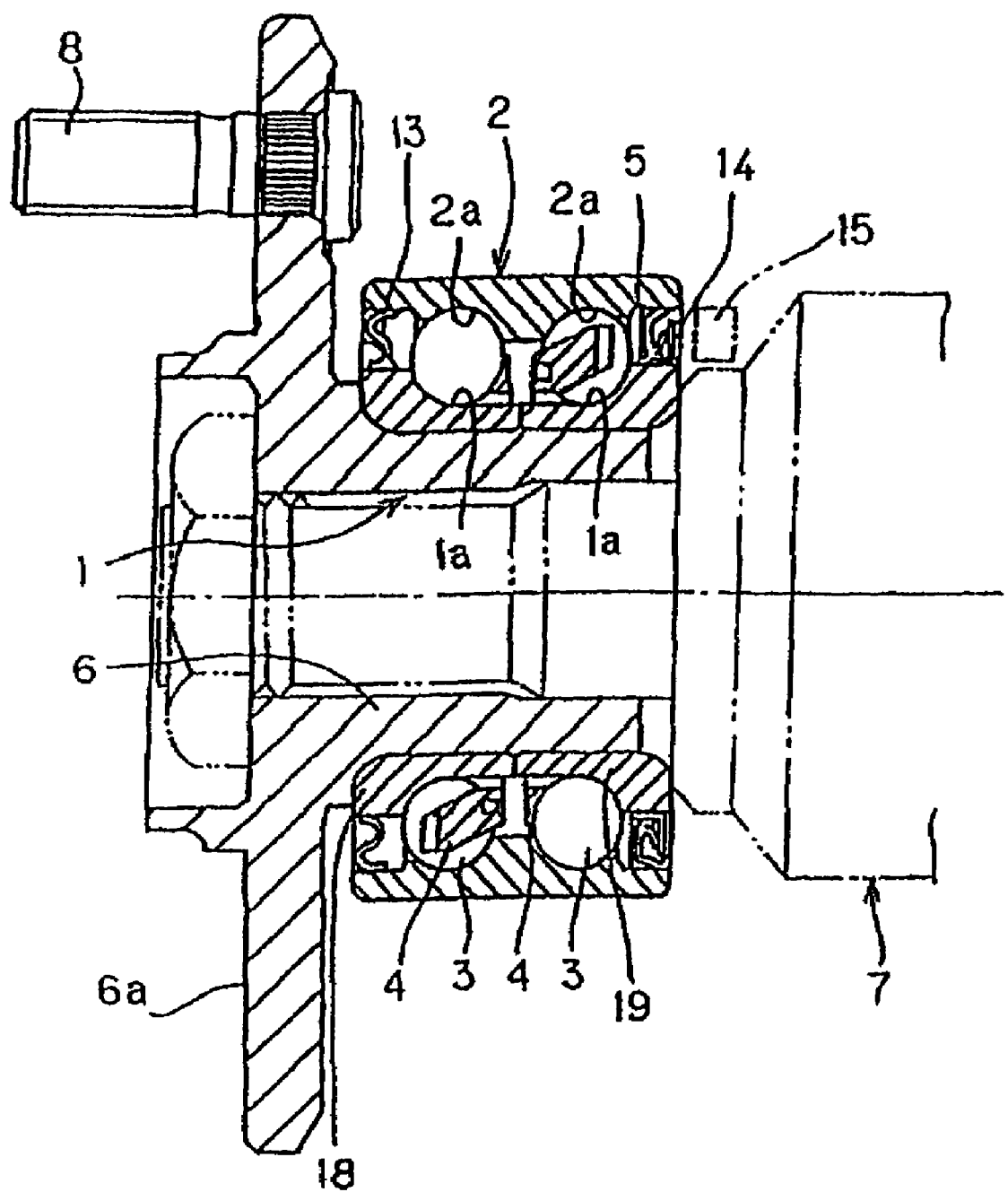
FIG. 13 is a sectional view of a wheel support bearing assembly in its entirety, which is equipped with the magnetic encoder according to the first embodiment of the present invention.

Hereinafter, one example of the wheel support bearing assembly having the magnetic encoder 10 incorporated therein, and the sealing device 5 used therein will be described in detail with particular reference to FIGS. 13 and 14. Referring to FIG. 13, the wheel support bearing assembly includes an inner member 1, an outer member 2, a plurality of rolling elements 3 accommodated between the inner and outer members 1 and 2, and sealing devices 5 and 13 for sealing opposite open ends of an annular bearing space delimited between the inner and outer members 1 and 2. One of the sealing devices, for example, the sealing device 5 is equipped with the magnetic encoder 10. The inner and outer members 1 and 2 have respective raceway surfaces 1a and 2a for the rolling elements 3, each of those raceway surfaces 1a and 2a being so formed in the form of a groove. The inner member 1 and the outer member 2 are members positioned inside and outside, respectively, that are rotatable relative to each other through the rolling elements 3, and may be a bearing inner race and a bearing outer race, respectively, or assemblies in which component parts separate from the bearing inner race and the bearing outer race are combined. Also, the inner member 1 may be a shaft. The rolling elements 3 are in the form of a ball or a roller, and balls are used therefor in the illustrated embodiment.

This wheel support bearing assembly is a double row rolling bearing and is, more specifically, rendered to be a double row angular contact ball bearing, in which the bearing inner race is made up of split type inner races 18 and 19 having the respective raceway surfaces 1a and 1a for the rolling element rows defined therein. Those inner races 18 and 19 are mounted on an outer periphery of an axle portion of a hub axle 6 and form the inner member 1 together with the hub axle 6. In place of an assembled component of three parts including the hub axle 6 and the split type inner races 18 and 19 as described above, the inner member 1 may be of a two-piece construction including a hub axle, in which the hub axle 6 and one of the inner races, that is, the inner race 18 are integrated together with the raceway surface formed on the hub axle, and the other inner race 19.

The hub axle 6 is coupled with one end (for example, an outer race) of a constant velocity universal joint 7, and a vehicle wheel (not shown) is secured to a flange portion 6a of the hub axle 6 by means of bolts 8. The constant velocity universal joint 7 has the other end (for example, an inner race)

adapted to be coupled with a drive shaft. The outer member 2 is a bearing outer race and is fitted to a housing (not shown), which may be, for example, a knuckle in a suspension system. The rolling elements 3 are retained by a retainer 4 for each row.

Figure 14:
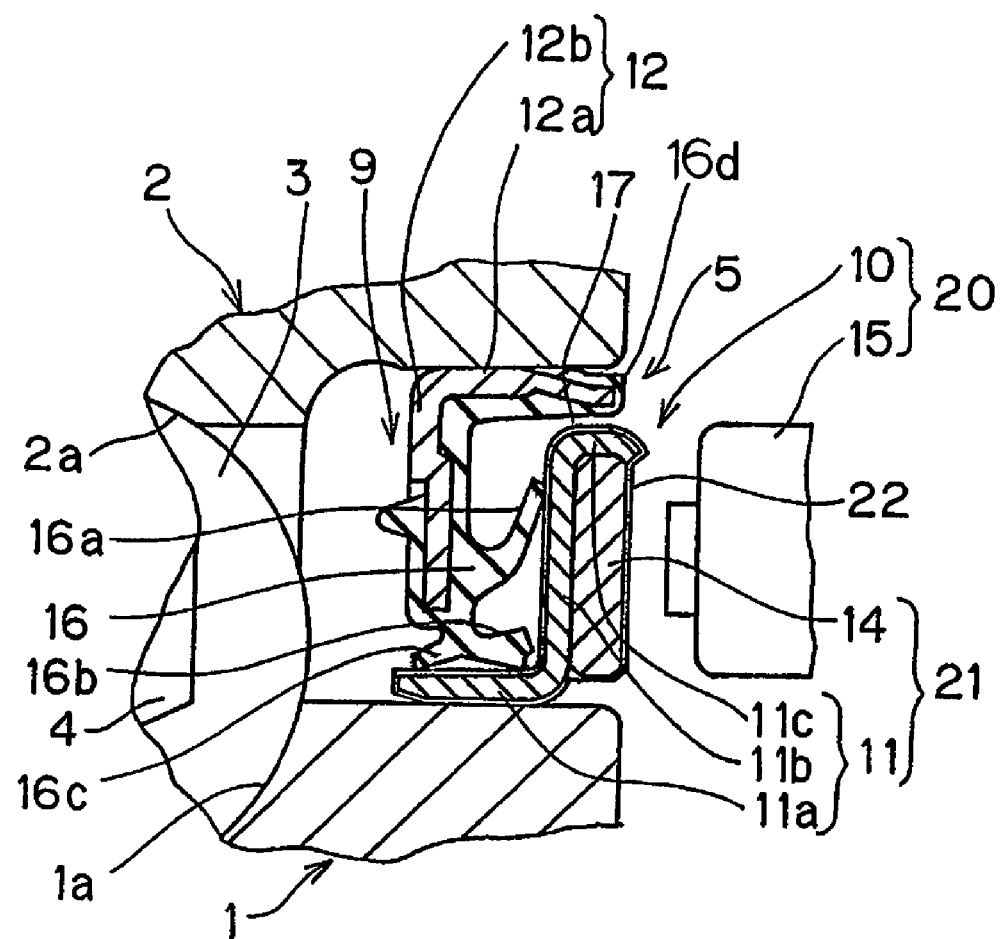
FIG. 14 is a fragmentary sectional view of the wheel support bearing assembly of FIG. 13.

FIG. 14 illustrates, on an enlarged scale, the sealing device 6 with the magnetic encoder incorporated therein. This sealing device 5 is similar to that shown in FIG. 3 and the details thereof will be described with reference to FIG. 14. This sealing device 5 is such that the magnetic encoder 10 or its core metal 11 serves as a slinger and is fitted to one of the inner member 1 and the outer member 2, which serves as a rotatable member. In this example, since the rotatable member is represented by the inner member 1, the magnetic encoder 10 is fitted to the inner member 1.

This sealing device 5 includes first and second annular sealing metal plates (11) and 12 fitted to the inner member 1 and the outer member 2, respectively. The first sealing plate (11) serves as the core metal 11 of the magnetic encoder 10 and will be hereinafter referred to as the core metal 11. The magnetic encoder 10 pertains to the first embodiment described specifically with reference to FIGS. 1 to 3 and, therefore, what has been described will not be reiterated. When the magnetic sensor 15 is held in face-to-face relation with the multipolar magnet 14 of the magnetic encoder 10, the rotation detecting device 20 for the detection of the number of revolutions of the vehicle wheel is completed.

The second sealing plate 12 is a member forming the sealing member 9 (FIG. 3) and is formed integrally with a side sealing lip 16a, slidably engaged with the upright portion 11b of the core metal 11, which is the first sealing plate, and radial sealing lips 16b and 16c slidably engaged with the cylindrical portion 11a of the core metal 11. Those sealing lips 16a to 16c form a part of an elastic member 16 bonded by vulcanization to the second sealing plate 12. Although the number of those sealing lips 16a to 16b may be arbitrarily chosen, the example shown in FIG. 14 makes use of one side sealing lip 16a and two radial sealing lips 16c and 16b that are positioned inside and outside in an axial direction. The elastic member 16 is held at a mounting area where the second sealing plate 12 is mounted on the stationary outer member 2. Specifically, the elastic member 16 includes a free end covering portion 16d covering a free end portion of a cylindrical wall 12a of the second sealing plate 12, ranging from an inner peripheral surface to an outer peripheral surface, which free end covering portion 16d is interposed at the mounting area between the second sealing plate 12 and the outer member 2. The cylindrical portion 12a of the second sealing plate 12 and the second cylindrical portion 11c of the core metal 11, which is the first sealing plate, are held in face-to-face relation with each other with a slight gap defined therebetween, which gap defines a labyrinth seal 17.

According to the wheel support bearing assembly of the structure described above, rotation of the inner member 1 rotatable together with the vehicle wheel can be detected by the magnetic sensor 15 through the magnetic encoder 10, fitted to this inner member 1, and the number of revolutions of the vehicle wheel can be thus detected.

Since the magnetic encoder 10 is rendered to be a component part of the sealing device 5, the rotation of the vehicle can be detected without the number of component parts increased. While the wheel support bearing assembly is generally used exposed to an environment of the road surface where the magnetic encoder 10 is often soaked with muddy salt water, it is possible to assuredly prevent a rust from occurring in the magnetic encoder 10 since the unitary component 21 in its entirety forming the magnetic encoder 10 is surface treated to have the anticorrosion property. Also, while it often occurs that particulates such as sand particulates may be trapped in between the magnetic encoder 10 and the magnetic sensor 15 held in face-to-face relation therewith, the frictional damage of the surface of the multipolar magnet 14 can be considerably minimized as compared with that made of the conventional magnet made of the elastic material since the multipolar magnet 14 made of the sintered element shows sufficient surface hardness.

Sealing between the inner and outer members 1 and 2 can be obtained by the sliding engagement of the sealing lips 16a to 16c, formed in the second sealing plate 12, with the core metal 11 and the labyrinth seal 17 defined by confronting the cylindrical portion 12a of the second sealing plate 12 with the second cylindrical portion 11c of the core metal 11 to form a slight gap between the second cylindrical portion 11c and the cylindrical portion 12a.

It is to be noted that although in the wheel support bearing assembly shown in FIGS. 13 and 14, the core metal 11 of the magnetic encoder 10 has been shown and described as having such a shape as shown in FIG. 1, any one of the examples shown in and described with reference to FIGS. 4 to 7 may be equally employed as the magnetic encoder 10.

Also, where the magnetic encoder 10 is used as a component part of the sealing device 5, the multipolar magnet 14 may be arranged so as to be oriented inwardly of the bearing assembly in a manner reverse to that in any one of the foregoing embodiments. In other words, the multipolar magnet 14 may be arranged on the surface of the core metal 11 which faces inwardly of the bearing assembly. In such case, the core metal 11 is preferably made of a non-magnetic material.

In addition, in the wheel support bearing assembly, in which the outer member serves as a rotatable member, the magnetic encoder is fitted to the outer member.

What is claimed is:

1. A magnetic encoder comprising:
   a multipolar magnet having magnetic poles formed therein, the magnetic poles alternating with each other in a direction circumferentially thereof;
   a core metal supporting the multipolar magnet;
   wherein the multipolar magnet is prepared from a sintered element formed by sintering a powdery mixture of a magnetic powder and a non-magnetic metallic powder and is fixed to the core metal by staking the core metal to form a unitary component made up of the sintered element and the core metal;
   wherein the unitary component is subjected to a surface treatment for anticorrosion,
   the surface treatment is an electrodeposition, and
   at least one of a surface of the sintered element and a surface of the core metal which contacts that surface of the sintered element is provided with a groove for penetration of an electrodepositing paint so that the paint acts as a bonding agent between the sintered element and the core metal.

2. The magnetic encoder as claimed in claim 1, wherein the groove is provided on the core metal.

3. The magnetic encoder as claimed in claim 1, wherein the surface treatment is a cation electrodeposition.

4. The magnetic encoder as claimed in claim 1, wherein a plurality of radial grooves and a ring-shaped groove crossing the radial grooves are provided on at least one of the sintered element and the metal core.

5. The magnetic encoder as claimed in claim 1, wherein the magnetic powder is a magnetic powder of a samarium system.

6. The magnetic encoder as claimed in claim 1, wherein the magnetic powder is a magnetic powder of a neodymium system.

7. The magnetic encoder as claimed in claim 1, wherein the non-magnetic metallic powder is a powder of tin.

8. The magnetic encoder as claimed in claim 1, wherein the powdery mixture contains two or more kinds of the magnetic powders or two or more kinds of the non-magnetic metallic powders.

9. A wheel support bearing assembly comprising the magnetic encoder as defined in claim 1.

10. The wheel support bearing assembly as claimed in claim 9,
wherein the wheel support bearing assembly rotatably supports a vehicle wheel relative to a vehicle body and comprises an outer member having an inner peripheral surface formed with double rows of raceway surfaces, an inner member having an outer peripheral surface formed with double rows of raceway surfaces opposed to the raceway surfaces in the outer member, and double rows of rolling elements interposed between the opposed raceway surfaces;
wherein the bearing assembly further includes a sealing device sealing an annular bearing space delimited between the outer member and the inner member;
wherein the sealing device includes a first sealing plate of an L-sectioned configuration mounted on one of the outer member and the inner member, which is a rotatable member, and a second sealing plate of an L-sectioned configuration opposed to the first sealing plate and mounted on the other of the outer member and the inner member, which is a stationary member; and
wherein a side sealing lip slidingly engageable with an upright portion of the first sealing plate and a radial sealing lip slidingly engageable with a first cylindrical portion of the first sealing plate are fixed to the second sealing plate, and the first sealing plate serves as the core metal of the magnetic encoder and the multipolar magnet is provided overlapped on the upright portion of the first sealing plate.

11. The wheel support bearing assembly as claimed in claim 9,
wherein the wheel support bearing assembly is operable to rotatably support a vehicle wheel relative to a vehicle body and comprises an outer member having an inner peripheral surface formed with double rows of raceway surfaces, an inner member having an outer peripheral surface formed with double rows of raceway surfaces opposed to the raceway surfaces in the outer member, and double rows of rolling elements interposed between the opposed raceway surfaces;
wherein the bearing assembly further includes a sealing device sealing an annular bearing space delimited between the outer member and the inner member;
wherein the sealing device includes a first sealing plate of an generally Z-sectioned configuration mounted on one of the outer member and the inner member, which is a rotatable member, and a second sealing plate of an L-sectioned configuration opposed to the first sealing plate and mounted on the other of the outer member and the inner member, which is a stationary member; and
wherein a side sealing lip slidingly engageable with an upright portion of the first sealing plate and a radial sealing lip slidingly engageable with a first cylindrical portion of the first sealing plate are fixed to the second sealing plate, and the first sealing plate serves as the core metal of the magnetic encoder and the multipolar magnet is provided overlapped on the upright portion thereof.

12. The wheel support bearing assembly as claimed in claim 11, wherein the upright portion of the first sealing plate, where the multipolar magnet is overlapped, is axially stepped to define an inner peripheral portion and an outer peripheral portion offset axially from the inner peripheral portion.

13. The wheel support bearing assembly as claimed in claim 11, wherein the multipolar magnet overlapped on the upright portion of the first sealing plate is fixed to the upright portion by staking a second cylindrical portion formed at an outer diametric edge of the upright portion.

14. The wheel support bearing assembly as claimed in claim 11, wherein a second cylindrical portion formed at an outer diametric edge of the upright portion of the first sealing plate is plastically deformed at circumferential locations to form plastically deformed portions which protrude in a radial direction towards an inner diametric side of the first sealing plate and wherein the multipolar magnet overlapped on the upright portion of the first sealing plate is fixed to the upright portion by the plastically deformed portions.

15. The wheel support bearing assembly as claimed in claim 11, wherein the multipolar magnet overlapped on the upright portion of the first sealing plate is fixed by plastically deforming pawl-shaped projections provided in an outer diametric edge of the upright portion of the first sealing plate.

* * * * *

UNITED STATES PATENT AND TRADEMARK OFFICE
CERTIFICATE OF CORRECTION

PATENT NO. : 7,592,799 B2
APPLICATION NO. : 11/662282
DATED : September 22, 2009
INVENTOR(S) : Tatsuo Nakajima et al.

It is certified that error appears in the above-identified patent and that said Letters Patent is hereby corrected as shown below:

Column 18, Line 65, claim 4 change "metal core." to --core metal.--.

Signed and Sealed this

Fifth Day of January, 2010

David J. Kappos
*Director of the United States Patent and Trademark Office*